(12) United States Patent
Miller (10) Patent No.: US 8,124,572 B2
(45) Date of Patent: *Feb. 28, 2012

(54) PRODUCTION OF BIOFUELS AND BIOLUBRICANTS FROM A COMMON FEEDSTOCK

(75) Inventor: Stephen Joseph Miller, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 11/862,742

(22) Filed: Sep. 27, 2007

(65) Prior Publication Data
US 2009/0088351 A1 Apr. 2, 2009

(51) Int. Cl.
*C10M 131/12* (2006.01)
*B01J 14/00* (2006.01)
*C10L 1/19* (2006.01)

(52) U.S. Cl. ............ 508/216; 422/189; 44/310; 44/308; 44/629; 585/240

(58) Field of Classification Search ............. 435/134; 549/518; 526/348.6; 508/485, 216; 422/189; 44/310, 308, 629; 585/240
See application file for complete search history.

(56) References Cited

U.S. PATENT DOCUMENTS

| | | | |
|---|---|---|---|
| 4,012,424 A * | 3/1977 | Sherwin et al. | 549/518 |
| 4,218,386 A | 8/1980 | Logan et al. | |
| RE32,241 E | 9/1986 | Saxer | |
| 4,792,418 A | 12/1988 | Rubin et al. | |
| 4,859,312 A | 8/1989 | Miller | |
| 4,992,605 A | 2/1991 | Craig et al. | |
| 5,158,665 A | 10/1992 | Miller | |
| 5,288,619 A * | 2/1994 | Brown et al. | 435/134 |
| 5,300,210 A | 4/1994 | Zones et al. | |
| 5,814,715 A * | 9/1998 | Chen et al. | 526/348.6 |
| 6,166,231 A | 12/2000 | Hoeksema | |
| 6,204,426 B1 | 3/2001 | Miller et al. | |
| 6,399,800 B1 | 6/2002 | Haas et al. | |
| 6,630,066 B2 | 10/2003 | Cash et al. | |
| 6,723,889 B2 | 4/2004 | Miller et al. | |
| 6,841,063 B2 | 1/2005 | Elomari | |
| 6,855,838 B2 | 2/2005 | Haas et al. | |
| 6,965,044 B1 | 11/2005 | Hammond et al. | |
| 2003/0004071 A1 * | 1/2003 | Ardito | 508/485 |
| 2004/0074760 A1 | 4/2004 | Portnoff et al. | |
| 2009/0069610 A1 | 3/2009 | Roberts et al. | |

OTHER PUBLICATIONS

U.S. Appl. No. 11/696,564, filed Apr. 4, 2007, Miller et al.
Huber et al., "Synthesis of Transportation Fuels from Biomass: Chemistry, Catalysts, and Engineering," Chem. Rev., vol. 106, pp. 4044-4098 (2006).
Rana et al., "A Review of Recent Advances on Process Technologies for Upgrading of Heavy Oils and Residua," Fuel, vol. 86, pp. 1216-1231 (2007).

* cited by examiner

*Primary Examiner* — Michael Marcheschi
*Assistant Examiner* — Chantel Graham
(74) *Attorney, Agent, or Firm* — Edward T. Mickelson; Parul P. Anderson (57) ABSTRACT

The present invention is directed to methods and systems for processing triglyceride-containing, biologically-derived oils, wherein such processing comprises conversion of triglycerides to free fatty acids and the separation of these fatty acids by saturation type. Such separation by type enables the efficient preparation of both lubricants and transportation fuels from a common source using a single integrated method and/or system.

14 Claims, 4 Drawing Sheets

PRODUCTION OF BIOFUELS AND BIOLUBRICANTS FROM A COMMON FEEDSTOCK

FIELD OF THE INVENTION

This invention relates generally to lubricants and fuels derived from biomass, and specifically to methods and systems for efficiently making biolubricants and biofuels from vegetable or crop oils.

BACKGROUND

Biofuels are of increasing interest for a number of reasons including: (1) they are a renewable resource, (2) their production is less dependent on geopolitical considerations, (3) they provide the possibility of a direct replacement of petroleum-based fuels in existing vehicles, and (4) the net greenhouse gas emissions can be substantially reduced by virtue of $CO_2$ uptake by biofuel precursors—particularly in the case of cellulose feedstocks. See Pearce, "Fuels Gold," New Scientist, 23 September, pp. 36-41, 2006.

An easily-obtainable biofuel is vegetable oil, which largely comprises triglycerides and some free fatty acids. The properties of vegetable oil, however, make it generally inappropriate for use as a direct replacement for petroleum diesel in vehicle engines, as the vegetable oils' viscosities are generally too high and do not burn cleanly enough, thereby leaving damaging carbon deposits on the engine. Additionally, vegetable oils tend to gel at lower temperatures, thereby hindering their use in colder climates. These problems are mitigated when the vegetable oils are blended with petroleum fuels, but still remain an impediment for long-term use in diesel engines. See Pearce, 2006; Huber et al., "Synthesis of Transportation Fuels from Biomass: Chemistry, Catalysts, and Engineering," Chem. Rev., vol. 106, pp. 4044-4098, 2006.

Transesterification is currently a method used to convert vegetable oils into diesel-compatible fuels (i.e., biodiesel) that can be burned in conventional diesel engines. However, a similar cold flow problem with conventional biodiesel fuels still remains. This problem is at least partly due to the fact that at lower temperatures, e.g., around freezing (ca. 0° C.), biodiesel often thickens and does not flow as readily. Conventional biodiesel is primarily composed of methyl esters which have long straight chain aliphatic groups attached to the carbonyl group. Also, the transesterification of vegetable oils exhibits a problem of producing more than 90% diesel range fuels with little or no kerosene or gasoline range fractions, thereby limiting the types of fuels produced therefrom. For the conversion of vegetable and other oils to some fuels (e.g., non-diesel), it is likely that the oils must first be converted to alkanes (paraffins).

It is also worth noting that unsaturation in the fatty acid contributes to poor oxidation stability and deposits, and that while hydrogenation will generally improve the oxidation stability of the fuel, it can make the already poor low temperature performance of the fuel even worse. Isomerization of the paraffins can ameliorate this problem.

Accordingly, methods and systems for efficiently processing vegetable and/or crop oils into a broader range of fuel types and lubricants, often simultaneously, would be highly beneficial.

BRIEF DESCRIPTION OF THE INVENTION

In some embodiments, the present invention is directed to methods (processes) and systems for processing triglyceride-containing, biologically-derived oils, wherein such processing comprises conversion of triglycerides to free fatty acids and the separation of these fatty acids by saturation type. Such separation by type enables the efficient preparation of both lubricants and transportation fuels from a common source using a single integrated method and/or system. In some embodiments, the transportation fuel (or transportation fuel component) is largely paraffinic, while in other embodiments it is substantially comprised of monoester species.

In some embodiments, the present invention is directed to methods comprising the steps of: (a) providing a quantity of biologically-derived oil comprising triglycerides; (b) processing the biologically-derived oil so as to hydrolyze at least some of the triglycerides and form free fatty acids therefrom, wherein the fatty acids are of a type selected from the group consisting of saturated fatty acids, monounsaturated fatty acids, and polyunsaturated fatty acids, and combinations thereof, (c) separating the fatty acids by type, such that at least the monounsaturated fatty acids are substantially isolated from the saturated fatty acids and the polyunsaturated fatty acids; (d) modifying at least some of the monounsaturated fatty acids to form an ester product (comprising, e.g., mono-, di-, and/or triesters); and (e) hydrotreating at least some of the saturated fatty acids and/or polyunsaturated fatty acids to yield alkanes (paraffins).

In some embodiments, the present invention is directed to systems for processing triglyceride-containing, biologically-derived oil, the systems comprising the following elements: (1) a hydrolysis unit for treating the biologically-derived oil (bio-oil) so as to hydrolyze at least some of the triglycerides contained therein, thereby forming free fatty acids; (2) a separation unit for separating the free fatty acids by saturation type, wherein said separating provides for a first portion comprising predominately monounsaturated fatty acids, and a second portion comprising predominately fatty acids other than monounsaturated fatty acids (i.e., saturated fatty acids, polyunsaturated fatty acids, and combinations thereof); (3) an esterification unit for converting at least some of the monounsaturated fatty acids in the first portion into an ester product (comprising, e.g., triesters) suitable for use as biolubricants; and (4) a hydroprocessing unit for hydrotreating saturated and polyunsaturated fatty acids in the second portion so as to produce paraffinic species suitable for use as (or in) transportation fuels.

In some embodiments, the present invention is directed to methods comprising the steps of: (a') providing a quantity of biologically-derived oil, said oil comprising triglycerides; (b') processing the biologically-derived oil so as to hydrolyze at least some of the triglycerides and form free fatty acids therefrom, wherein the fatty acids are of a type selected from the group consisting of saturated fatty acids, monounsaturated fatty acids, and polyunsaturated fatty acids, and combinations thereof; (c') separating the fatty acids by type, such that at least the monounsaturated fatty acids are substantially isolated from the saturated fatty acids and the polyunsaturated fatty acids; (d') modifying at least some of the monounsaturated fatty acids to form an ester product (e.g., comprising triesters); and (e') esterifying at least some of the saturated fatty acids with a quantity of at least one alcohol species so as to yield a quantity of monoesters.

In some embodiments, the present invention is directed to a system for processing triglyceride-containing, biologically-derived oil, the system comprising the following elements: (1') a hydrolysis unit for treating the biologically-derived oil so as to hydrolyze at least some of the triglycerides contained therein, thereby forming free fatty acids; (2') a separation unit for separating the free fatty acids by saturation type, wherein said separating provides for (i) a first portion comprising predominately monounsaturated fatty acids, and (ii) a second portion comprising saturated fatty acids; (3') a first esterification unit for converting at least some of the monounsaturated fatty acids in the first portion into a first ester product (e.g., comprising triester species) suitable for use as a biolubricant; and (4') a second esterification unit for saturated (and possibly polyunsaturated) fatty acids in the second portion so as to produce a second (e.g., monoester) product.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

1. Introduction

In some embodiments, the present invention is directed to methods and systems for processing triglyceride-containing, biologically-derived oils, wherein such processing comprises conversion of triglycerides to free fatty acids and the separation of these fatty acids by saturation type. Such separation by type enables the efficient preparation of both lubricants and transportation fuels from a common source using a single integrated method and/or system. In some embodiments, such methods produce paraffinic fuels, whereas in other embodiments, such methods produce monoester-based fuels.

2. Definitions

Certain terms and phrases are defined throughout this description as they are first used, while certain other terms used in this description are defined below:

The prefix "bio," as used herein, refers to an association with a renewable resource of biological origin, such resources generally being exclusive of fossil fuels.

A "biologically-derived oil," as defined herein, refers to any triglyceride-containing oil that is at least partially derived from a biological source such as, but not limited to, crops, vegetables, microalgae, and the like. Such oils may further comprise free fatty acids. The biological source is henceforth referred to as "biomass." For more on the advantages of using microalgae as a source of triglycerides, see R. Baum, "Microalgae are Possible Source of Biodiesel Fuel," Chem. & Eng. News, vol. 72(14), pp. 28-29, 1994.

"Triglyceride," as defined herein, refers to a class of molecules having the following molecular structure:

where x, y, and z can be the same or different, and wherein one or more of the branches defined by x, y, and z can have unsaturated regions.

A "carboxylic acid" or "fatty acid," as defined herein, is a class of organic acids having the general formula:

where "R" is generally a saturated (alkyl) hydrocarbon chain or a mono- or polyunsaturated(alkenyl)hydrocarbon chain.

"Lipids," as defined herein, broadly refers to the class of molecules comprising fatty acids, and ti-, di-, and monoglycerides.

"Hydrolysis" of triglycerides yields free fatty acids and glycerol, such fatty acid species also commonly referred to as carboxylic acids (see above).

"Transesterification," or simply "esterification," refers to the reaction between a fatty acid and an alcohol to yield an ester species.

"Hydroprocessing" refers to processes that react a hydrocarbon-based material with hydrogen, typically under pressure and with a catalyst (hydroprocessing can be non-catalytic). Such processes include, but are not limited to, hydrodeoxygenation (of oxygenated species), hydrotreating, hydrocracking, hydroisomerization, and hydrodewaxing. For examples of such processes, see Cash et al., U.S. Pat. No. 6,630,066; and Elomari, U.S. Pat. No. 6,841,063. Embodiments of the present invention utilize such hydroprocessing to convert triglycerides to paraffins. The terms "hydroprocessing" and "hydrotreating" are used interchangeably herein.

"Isomerizing," as defined herein, refers to catalytic processes that typically convert n-alkanes to branched isomers. ISODEWAXING (Trademark of CHEVRON U.S.A. INC.) catalysts are representative catalysts used in such processes. See, e.g., Zones et al., U.S. Pat. No. 5,300,210; Miller, U.S. Pat. No. 5,158,665; and Miller, U.S. Pat. No. 4,859,312.

"Transportation fuels," as defined herein, refer to hydrocarbon-based fuels suitable for consumption by vehicles. Such fuels include, but are not limited to, diesel, gasoline, jet fuel and the like.

"Diesel fuel," as defined herein, is a material suitable for use in diesel engines and conforming to the current version at least one of the following specifications: ASTM D 975— "Standard Specification for Diesel Fuel Oils"; European Grade CEN 90; Japanese Fuel Standards JIS K 2204; The United States National Conference on Weights and Measures (NCWM) 1997 guidelines for premium diesel fuel; and The United States Engine Manufacturers Association recommended guideline for premium diesel fuel (FQP-1A).

"Lubricants," as defined herein, are substances (usually a fluid under operating conditions) introduced between two moving surfaces so to reduce the friction and wear between them. Base oils used as motor oils are generally classified by the American Petroleum Institute as being mineral oils (Group I, II, and III) or synthetic oils (Group IV and V). See American Petroleum Institute (API) Publication Number 1509.

"Pour point," as defined herein, represents the lowest temperature at which a fluid will pour or flow. See, e.g., ASTM International Standard Test Methods D 5950-96, D 6892-03, and D 97.

"Cloud point," as defined herein, represents the temperature at which a fluid begins to phase separate due to crystal formation. See, e.g., ASTM Standard Test Methods D 5773-95, D 2500, D 5551, and D 5771.

As defined herein, "$C_n$," where "n" is an integer, describes a hydrocarbon or hydrocarbon-containing molecule or fragment (e.g., an alkyl or alkenyl group) wherein "n" denotes the number of carbon atoms in the fragment or molecule—irrespective of linearity or branching.

3. Biolubricants and Paraffins from Triglyceride-Containing Precursors 3.1 Methods As mentioned previously, and with reference to FIG. 1, in some embodiments the present invention is directed to methods comprising the steps of: (Step 101) providing a quantity of biologically-derived oil (bio-oil) comprising triglycerides; (Step 102) processing the biologically-derived oil so as to hydrolyze at least some of the triglycerides and form free fatty acids therefrom, wherein the fatty acids are of a type selected from the group consisting of saturated fatty acids, monounsaturated fatty acids, and polyunsaturated fatty acids, and combinations thereof; (Step 103) separating the fatty acids by type, such that at least the monounsaturated fatty acids are substantially isolated from the saturated fatty acids and the polyunsaturated fatty acids; (Step 104a) modifying at least some of the monounsaturated fatty acids to form an ester product (e.g., comprising triesters); and (Step 104b) hydrotreating at least some of the saturated fatty acids and/or polyunsaturated fatty acids to yield alkanes (paraffins). Note, however, that in some embodiments, one or both of Steps 104a and 104b could be eliminated. Note also that in some embodiments, such ester products can include one or more of the following: mono-, di-, and triester species, and hydroxylated analogues thereof.

Figure 1:
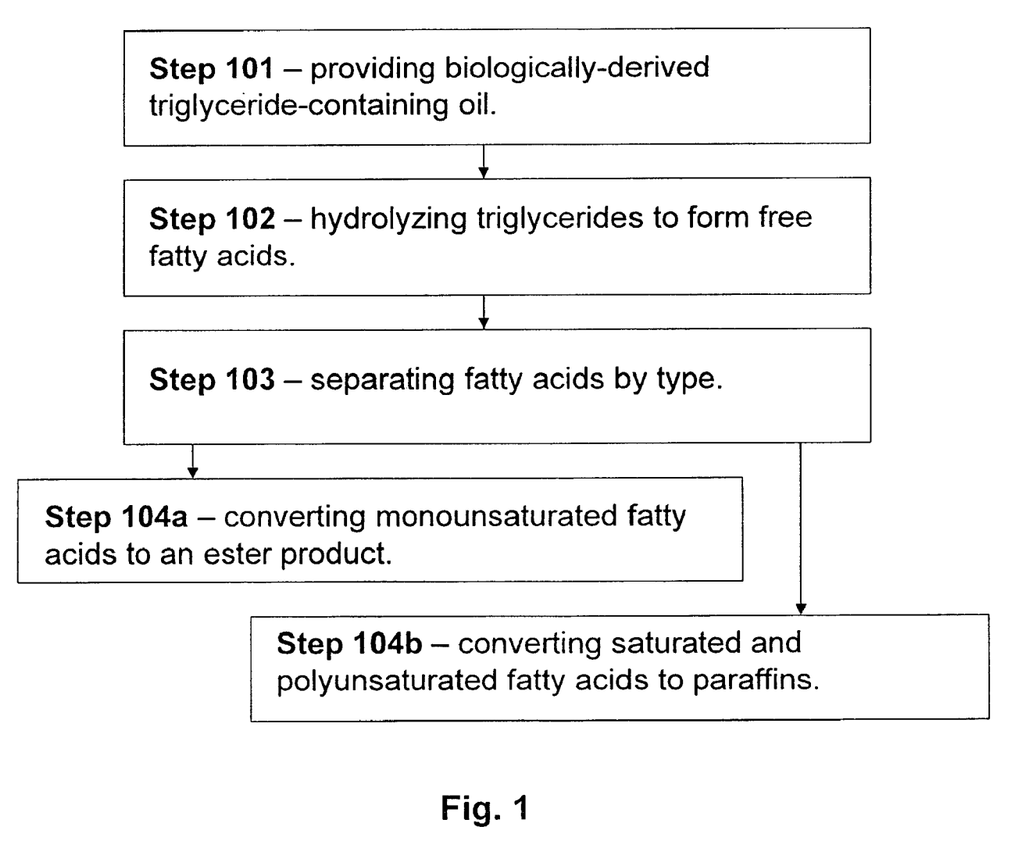
FIG. 1 depicts, in stepwise fashion, a method for producing both ester-based biolubricants (e.g., comprising triesters) and paraffinic fuels from a common biologically-derived oil, in accordance with some embodiments of the present invention.

In some embodiments, such above-described methods further comprise an initial step of subjecting biomass to an extraction process, wherein said extraction process provides for a quantity of biologically-derived oil comprising triglycerides. Typically, such an extraction process involves solvent extraction. Such processes are well-known to those of skill in the art. See, e.g., Hoeksema, U.S. Pat. No. 6,166,231.

In some such above-described method embodiments, the biologically-derived oil originates from a biomass source selected from the group consisting of crops, vegetables, microalgae, and combinations thereof. Those of skill in the art will recognize that generally any biological source of lipids can serve as the biomass from which the biologically-derived oil comprising triglycerides can be obtained. It will be further appreciated that some such sources are more economical and more amenable to regional cultivation, and also that those sources from which food is not derived may be additionally attractive (so as not to be seen as competing with food).

In some such above-described method embodiments, the processing step comprises acid- or base-catalyzed hydrolysis. Hydrolysis of triglycerides to yield free fatty acids and glycerol is well-established and known to those of skill in the art. See, e.g., Logan et al., U.S. Pat. No. 4,218,386.

While those of skill in the art will recognize that a variety of separation techniques can be suitably employed (e.g., urea complexation), in some such above-described method embodiments the separating step comprises fractional crystallization. Fractional crystallization is a well-established method of separating/purifying molecular compounds based on their differential kinetics of crystallization. See, e.g., Rubin et al., U.S. Pat. No. 4,792,418; and Saxer, U.S. Pat. No. RE 32,241.

In some such above-described method embodiments, the saturated fatty acids and the polyunsaturated fatty acids are substantially isolated from each other using a separation technique such as those described above. In some such embodiments, at least some of the saturated fatty acids, having been so isolated, are esterified to yield a biodiesel (or other, e.g., monoester) product.

In some such above-described method embodiments, the step of modifying comprises the following substeps: (a) esterifying monounsaturated fatty acids so as to form unsaturated esters; (b) epoxidizing the unsaturated esters to form epoxy-ester species comprising an epoxide ring; (c) opening the ring of the epoxy-ester species to form dihydroxy esters; and (d) esterifying at least some of the dihydroxy esters with an esterifying species to form an ester product comprising esters selected from the group consisting diesters, triesters, and combinations thereof; wherein the esterifying species is selected from the group consisting of carboxylic acids, acyl halides, acyl anhydrides, and combinations thereof. Note that some of the ester species in the ester product may retain one or more hydroxyl groups. Note too that in some such embodiments, substeps (a) and (b) are carried out simultaneously, whereas in some or other embodiments, substeps (b) and (c) are carried out simultaneously. Esterification of monounsaturated fatty acids in this manner has been described in commonly-assigned U.S. patent application Ser. No. 11/696,564; filed Apr. 4, 2007.

In some embodiments, the substep of esterifying the monounsaturated fatty acids (substep a) involves at least one alcohol species, and in some such embodiments at least one alcohol species generally comprises a $C_1$ to $C_{20}$ alcohol, and typically a $C_5$ to $C_{20}$ alcohol. In these or other embodiments, the substep of esterifying the monounsaturated fatty acids with at least one alcohol species involves prior or concurrent conversion of the fatty acids to one or more species selected from the group consisting of acyl halide species, acyl anhydride species, and combinations thereof. Such esterification of fatty acids is well-established in the art. See, e.g., Haas et al., U.S. Pat. Nos. 6,855,838 and 6,399,800; and Hammond et al., U.S. Pat. No. 6,965,044.

Regarding the substep of epoxidizing the unsaturated esters to form epoxy-ester species comprising an epoxide ring (substep b), in some embodiments, the above-described monounsaturated ester can be reacted with a peroxide (e.g., $H_2O_2$) or a peroxy acid (e.g., peroxyacetic acid) to generate an epoxy-ester species. See, e.g., D. Swern, in *Organic Peroxides* Vol. II, Wiley-Interscience, New York, 1971, pp. 355-533; and B. Plesnicar, in Oxidation in *Organic Chemistry, Part C*, W. Trahanovsky (ed.), Academic Press, New York 1978, pp. 221-253. Additionally or alternatively, the olefinic portion of the monounsaturated ester can be efficiently transformed to the corresponding dihydroxy ester by using highly selective reagents such as osmium tetroxide ($OsO_4$) (M. Schroder, Chem. Rev. vol. 80, p. 187, 1980) and potassium permanganate ($KMnO_4$) (Sheldon and Kochi, in *Metal-Catalyzed Oxidation of Organic Compounds*, pp. 162-171 and 294-296, Academic Press, New York, 1981).

Regarding the substep of opening the ring of the epoxy-ester species to form dihydroxy esters (substep c), this substep is usually an acid-catalyzed hydrolysis. Exemplary acid catalysts include, but are not limited to, mineral-based Brönsted acids (e.g., HCl, $H_2SO_4$, $H_3PO_4$, perhalogenates, etc.), Lewis acids (e.g., $TiCl_4$ and $AlCl_3$), solid acids such as acidic aluminas and silicas or their mixtures, and the like. See, e.g., Chem. Rev. vol. 59, p. 737, 1959; and Angew. Chem. Int. Ed., vol. 31, p. 1179, 1992. The epoxide ring opening to the diol can also be accomplished by base-catalyzed hydrolysis using aqueous solutions of KOH or NaOH.

In some embodiments, such above-described methods further comprise a step of catalytically isomerizing at least some of the alkanes to yield an isomerized alkane mixture. In some such above-described embodiments, the step of catalytically isomerizing results in superior fuel properties relative to those of the non-isomerized paraffinic (alkane) product (although the paraffinic product itself could find use as a fuel or other commodity). In some such embodiments, the step of isomerizing is carried out using an isomerization catalyst. Suitable such isomerization catalysts can include, but are not limited to Pt or Pd on a support such as, but further not limited to, SAPO-11, SM-3, SSZ-32, ZSM-23, ZSM-22, and similar such supports. In some or other embodiments, the step of isomerizing the paraffinic product comprises use of a Pt or Pd catalyst supported on an acidic support material selected from the group consisting of beta or zeolite Y molecular sieves, $SiO_2$, $Al_2O_3$, $SiO2-Al_2O_3$, and combinations thereof. In some such embodiments, the isomerization is carried out at a temperature between about 500° F. and about 750° F. The operating pressure is typically 200 to 2000 pounds-force per square inch gauge (psig), and more typically 200 psig to 1000 psig. Hydrogen flow rate is typically 50 to 5000 standard cubic feet/barrel (SCF/barrel). For other suitable isomerization catalysts, see, e.g., Zones et al., U.S. Pat. No. 5,300,210; Miller, U.S. Pat. No. 5,158,665; and Miller, U.S. Pat. No. 4,859,312.

With regard to the catalytically-driven isomerizing step described above, in some embodiments, the methods described herein may be conducted by contacting the paraffinic (alkane) product with a fixed stationary bed of catalyst, with a fixed fluidized bed, or with a transport bed. In one presently contemplated embodiment, a trickle-bed operation is employed, wherein such feed is allowed to trickle through a stationary fixed bed, typically in the presence of hydrogen. For an illustration of the operation of such catalysts, see Miller et al., U.S. Pat. Nos. 6,204,426 and 6,723,889.

In some embodiments, the isomerized alkane mixture is suitable (or better suited) for use as a transportation fuel. Typically, when such isomerized alkanes are used as/in a transportation fuel, they are predominately in the range of $C_6$-$C_{18}$ species. In some such embodiments, the isomerized alkane mixture is mixed or admixed with existing transportation fuels in order to create new fuels or to modify the properties of existing fuels. Isomerization and blending can be used to modulate and maintain pour point and cloud point of the fuel, lubricant, or other product at suitable values.

In some embodiments, the ester products are suitable for use as lubricants. Such species can be used neat, or they can be used as an additive to impart lubricity. In some such embodiments, wherein the ester products are used as additives, they are blended with one or more species to collectively form an additive (vide infra).

In some embodiments, such above-described methods further comprise a step of blending the ester product with one or more other triester species derived from a different source. In some or other embodiments, such above-described methods further comprise a step of blending the ester product with one or more diester species. In some or still other embodiments, such above-described methods further comprise a step of blending the ester product with a base oil selected from the group consisting of Group I oils, Group II oils, Group III oils, and combinations thereof.

In some such above-described method embodiments, the step of hydrotreating involves a hydroprocessing catalyst and a hydrogen-containing environment. In some such embodiments, the hydroprocessing catalyst is selected from the group consisting of cobalt-molybdenum (Co—Mo) catalyst, nickel-molybdenum (Ni—Mo) catalyst, noble metal catalyst, and combinations thereof. Hydroprocessing conditions generally include temperature in the range 350° C.-450° C. and pressure in the range of about 4.8 MPa to about 15.2 MPa. For a general review of hydroprocessing, see, e.g., Rana et al., "A Review of Recent Advances on Process Technologies for Upgrading of Heavy Oils and Residua," Fuel, vol. 86, pp. 1216-1231, 2007. For an example of how triglycerides can be hydroprocessed to yield a paraffinic product, see Craig et al., U.S. Pat. No. 4,992,605.

3.2 Systems

Figure 2:
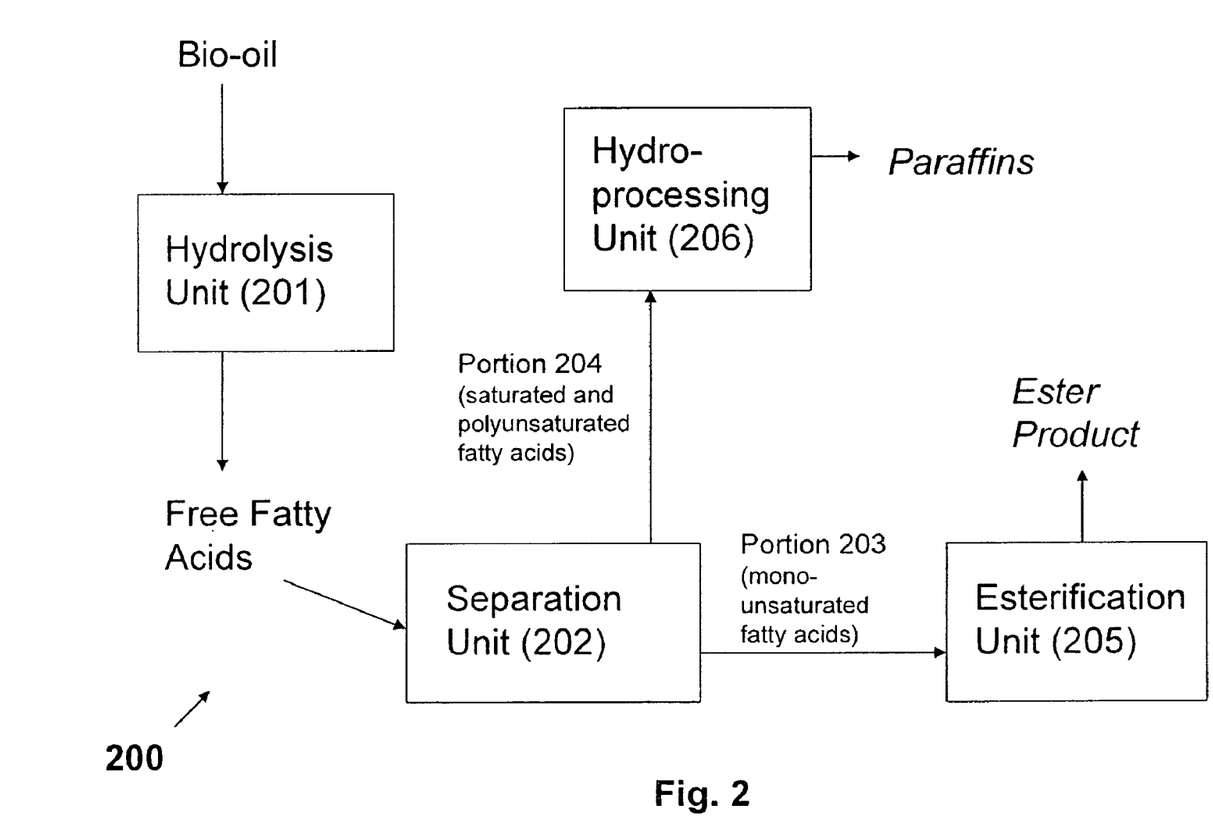
FIG. 2 illustrates an exemplary system for implementing the method depicted in FIG. 1.

As already mentioned in a previous section, and with reference to FIG. 2, in alternate embodiments the present invention is directed to systems (e.g., system 200) for processing triglyceride-containing, biologically-derived oil, the systems comprising the following elements: a hydrolysis unit 201 for treating the biologically-derived oil (bio-oil) so as to hydrolyze at least some of the triglycerides contained therein, thereby forming free fatty acids; a separation unit 202 for separating the free fatty acids by saturation type, wherein said separating provides for a first portion 203 comprising predominately monounsaturated fatty acids, and a second portion 204 comprising predominately fatty acids other than monounsaturated fatty acids, i.e., saturated fatty acids, polyunsaturated fatty acids, and combinations thereof; an esterification unit 205 for converting at least some of the monounsaturated fatty acids in the first portion into an ester product suitable for use as a biolubricant; and a hydroprocessing unit 206 for hydrotreating saturated and polyunsaturated fatty acids in the second portion so as to produce paraffinic species.

Generally, all of the above-described system units are configured for processing a biologically-derived oil in accordance with the methods described in Section 3.1. Further, there is typically a proximal relationship between the various units that comprise system 200, but this need not be the case. Such relationships may be influenced by existing infrastructure and other economic considerations.

In some embodiments, the above-described system further comprises an oil extraction unit for extracting the triglyceride-containing oil from biomass. Typically, such extraction units are constructed so as to enable the solvent extractions described above (Section 3.1) to be carried out in an efficient manner.

In some embodiments, the above-described system further comprises an isomerization unit for isomerizing at least some of the paraffinic species produced by the hydroprocessing unit. As in the case of the extraction unit, the isomerization unit is typically configured so as to efficiently isomerize the paraffinic species produced—in accordance with method embodiments described above.

In some embodiments, the above-described system further comprises a secondary separation unit for treating the second portion 204 so as to substantially isolate the saturated fatty acids from the polyunsaturated fatty acids. Depending on the embodiment, the secondary separation unit can be configured for a variety of different types of separation techniques. An exemplary method for separating saturated fatty acids from polyunsaturated fatty acids is via urea complexation.

Additional processing units may also be integrated into system 200 so as to effect blending, mixing, or similar processing with materials other than those produced by the methods described herein. Such additional processing units can facilitate the manufacture of fuels, lubricants or other finished products. In some embodiments, such units are modular so as to facilitate changes/alterations in the system configuration as production needs change.

4. Biolubricants and Monoesters from Triglyceride-Containing Precursors 4.1 Methods Referring to FIG. 3, in some embodiments the present invention is directed to methods comprising the steps of: (Step 301) providing a quantity of biologically-derived oil, said oil comprising triglycerides; (Step 302) processing the biologically-derived oil so as to hydrolyze at least some of the triglycerides and form free fatty acids therefrom, wherein the fatty acids are of a type selected from the group consisting of saturated fatty acids, monounsaturated fatty acids, and polyunsaturated fatty acids, and combinations thereof; (Step 303) separating the fatty acids by type, such that at least the monounsaturated fatty acids are substantially isolated from the saturated fatty acids and the polyunsaturated fatty acids; (Step 304*a*) modifying at least some of the monounsaturated fatty acids to form an ester product (e.g., comprising triester species); and (Step 304*b*) esterifying at least some of the saturated fatty acids with a quantity of at least one alcohol species so as to yield a quantity of monoesters. Typically, in some such embodiments, the alcohol species used in Step 304*b* is a $C_1$-$C_4$ alcohol, including secondary alcohols, such as isopropanol, to get a lower pour point. Note that in some embodiments, such ester products produced in Step 304*a* can include one or more of the following: mono-, di-, and triester species, and hydroxylated analogues thereof.

Figure 3:
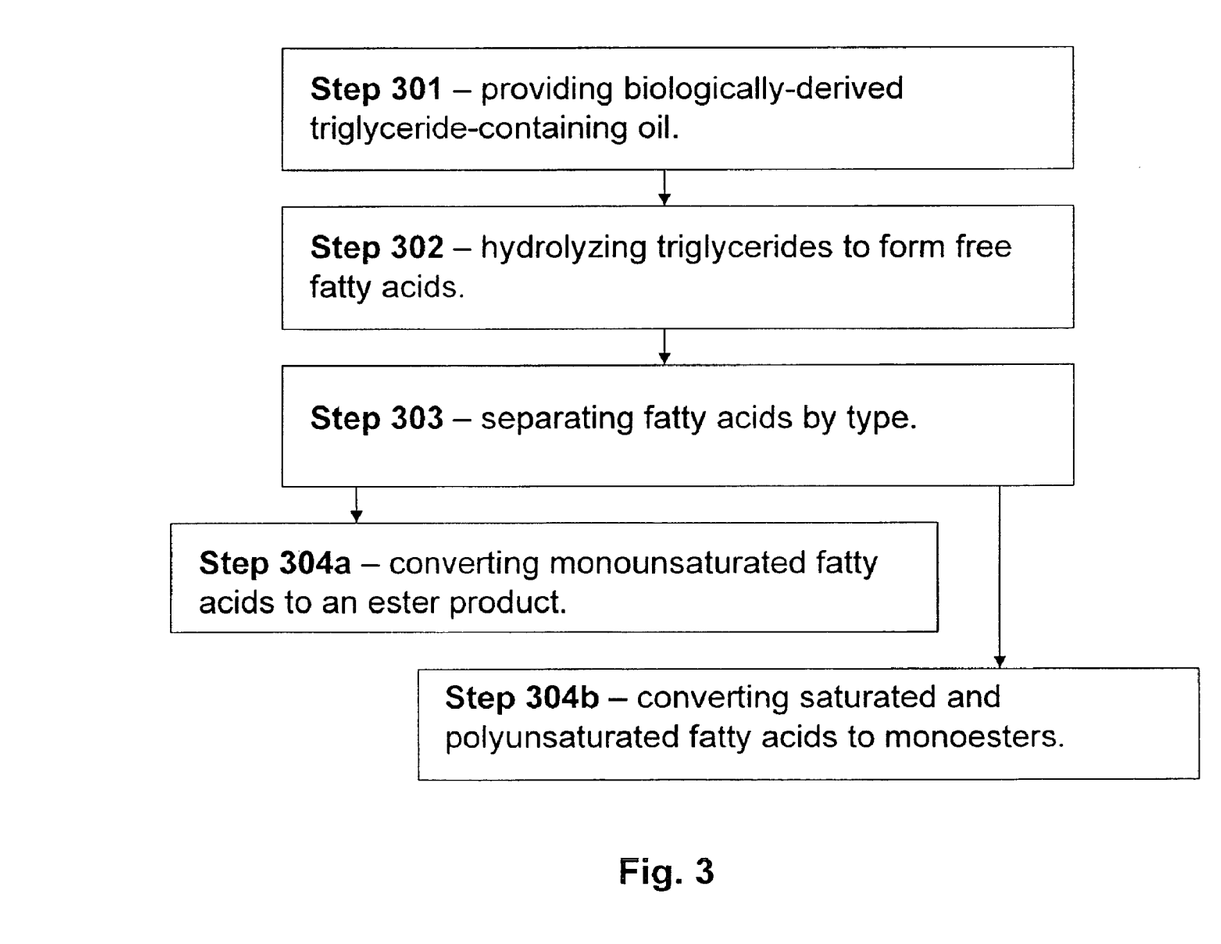
FIG. 3 depicts, in stepwise fashion, a method for producing both ester-based biolubricants and monoester-based fuels from a common biologically-derived oil, in accordance with some embodiments of the present invention.

In some embodiments, such above-described methods further comprise a step of subjecting biomass to an extraction process, wherein said extraction process provides for a quantity of biologically-derived oil comprising triglycerides. Such extraction processes are generally as described above in Section 3.1.

In some such above-described method embodiments, the biologically-derived oil originated from a biomass source such as, but not limited to, crops, vegetables, microalgae, combinations thereof, and the like.

In some such above-described method embodiments, the processing step comprises acid- or base-catalyzed hydrolysis. Similarly, in some such above-described method embodiments, the separating step comprises fractional crystallization. Such steps are generally as described above in Section 3.1.

In some such above-described method embodiments, the saturated fatty acids and the polyunsaturated fatty acids are substantially isolated from each other. Such species are typically isolated using one or more separation techniques such as those described above.

In some such above-described method embodiments, the step of modifying comprises the following substeps: (a') esterifying monounsaturated fatty acids so as to form unsaturated esters; (b') epoxidizing the unsaturated esters to form epoxy-ester species comprising an epoxide ring; (c') opening the ring of the epoxy-ester species to form dihydroxy esters; and (d') esterifying the dihydroxy esters with an esterifying species to form the ester product, wherein the esterifying species is selected from the group consisting of carboxylic acids, acyl halides, acyl anhydrides, and combinations thereof. All such substeps are generally as described above in Section 3.1.

In some such above-described method embodiments, the ester product is suitable for use as lubricants. Similarly, they may be mixed or admixed with other lubricants or fuels to impart and/or modulate lubricity and/or other properties of these or other products. In some embodiments, such above-described methods further comprise a step of blending the triesters with a base oil selected from the group consisting of Group I oils, Group II oils, Group III oils, and combinations thereof.

In some embodiments, such above-described methods further comprise a step of blending the ester product with one or more other triester species derived (biologically or otherwise) from a different source. In some or other embodiments, such above-described methods further comprise a step of blending the ester product with one or more diester species.

In some such above-described method embodiments, the monoesters are utilized as a transportation fuel. In some or other embodiments, the monoesters are utilized as a component of a transportation fuel. In such embodiments wherein the monoesters are operable for use as (or in) a transportation fuel, the transportation fuel is a diesel fuel.

4.2 Systems

Figure 4:
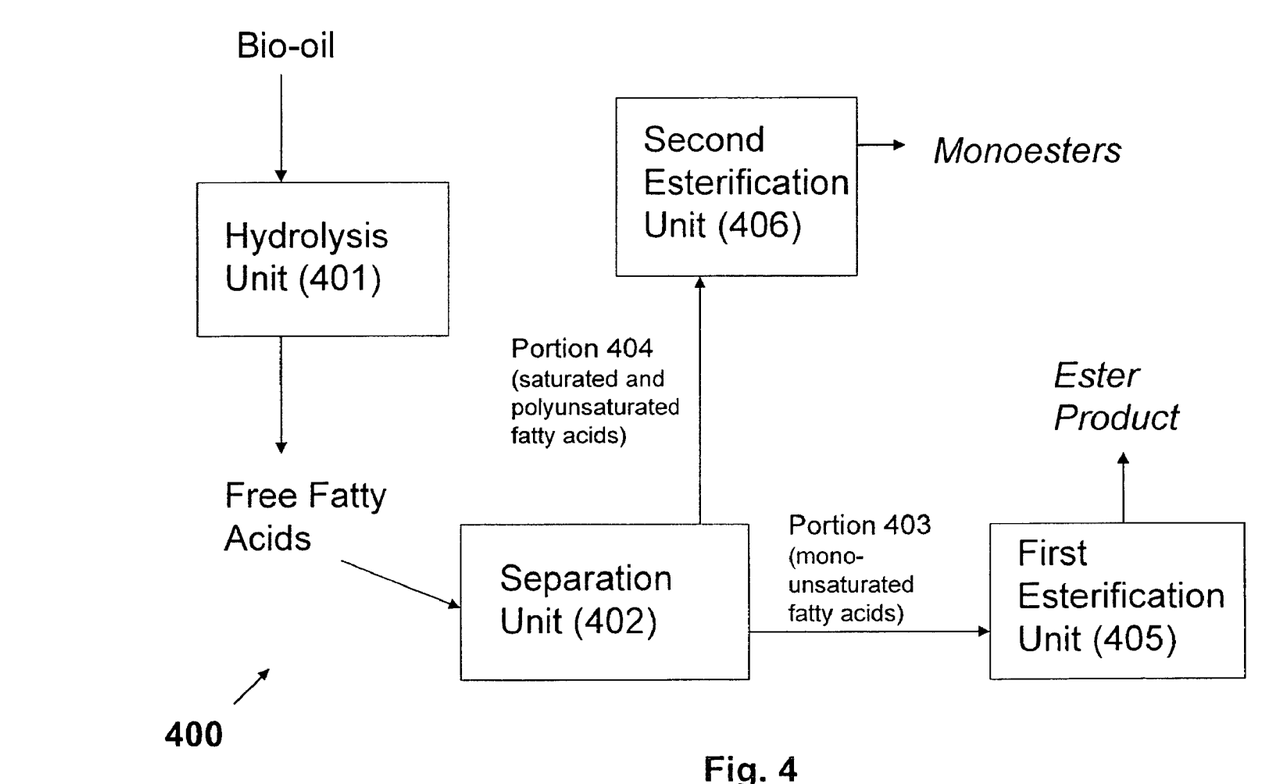
FIG. 4 illustrates an exemplary system for implementing the method depicted in FIG. 3.

Referring to FIG. 4, in some embodiments, the present invention is directed to a system 400 for processing triglyceride-containing, biologically-derived oil, the system comprising the following elements: a hydrolysis unit 401 for treating the biologically-derived oil so as to hydrolyze at least some of the triglycerides contained therein, thereby forming free fatty acids; a separation unit 402 for separating the free fatty acids by saturation type, wherein said separating provides for (i) a first portion 403 comprising predominately monounsaturated fatty acids, and (ii) a second portion 404 comprising saturated fatty acids; a first esterification unit 405 for converting at least some of the monounsaturated fatty acids in the first portion into an ester product suitable for use as a biolubricant; and a second esterification unit 406 for saturated (and possibly polyunsaturated) fatty acids in the second portion so as to produce monoester species.

In some embodiments, such above-described systems further comprise an oil extraction unit for extracting the triglyceride-containing oil from biomass. Such an extraction unit is generally suitable for implementing the extractions such as described in Section 4.1 and is typically analogous to the extraction unit described in Section 3.2.

In some embodiments, such above-described systems further comprise a secondary separation unit for treating the second portion so as to substantially isolate the saturated fatty from the polyunsaturated fatty acids. Such a secondary separation unit is generally operable for implementing the types of separations described in Section 4.1. Those of skill in the art will recognize that there is a great deal of variability in the types of separations and the units involved in implementing such separations, and that in some instances such variability is dependent on the nature of the triglycerides in the material being processed.

In some such above-described system embodiments, the hydrolysis unit, the first esterification unit, and the second esterification unit are generally analogous to the hydrolysis and esterification units described in Section 3.2, and generally applicable for implementing the methods described in Section 4.1.

As in the case with system 200 above, additional processing units may also be integrated into system 400 so as to effect blending, mixing, or similar processing with materials other than those produced by the methods described herein. Such additional processing units can facilitate the manufacture of fuels, lubricants or other finished products. In some embodiments, such units are modular so as to facilitate changes/alterations in the system configuration as production needs change.

5. Variations

In some embodiments, non-crop sources of triglyceride-containing oil can be mixed or admixed with the biologically-derived oil used herein. Additionally or alternatively, sources of free fatty acids could be similarly utilized.

6. Example

The following example is provided to demonstrate particular embodiments of the present invention. It should be appreciated by those of skill in the art that the methods disclosed in the example which follows merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE

This Example serves to illustrate how fractional crystallization can be utilized to separate fatty acids according to their degree of separation, in accordance with some embodiments of the present invention. Such separations are known in the art, as this Example is based on a procedure described by J. Singh et al., "The Component Fatty Acids of Penicillium Calcium Fat," Biochem. J., vol. 62, p. 222 (1956). Accordingly, it is the integration of such separations with the methods and systems of the present invention that is novel.

A mixture of fatty acids is prepared comprising: 46.89 g of oleic acid (a monounsaturated fatty acid), 16.23 g of linoleic acid (a polyunsaturated fatty acid), and 58.52 g of saturated fatty acid (total weight of mixture is 121.64 g). The composition of the mixture (by weight %) is: 38.56% oleic acid, 13.3% linoleic acid, and 48.12% saturated acid.

The above mixture is crystallized at −65° C. with 10 volumes of acetone (~1.5 L). The first filtrate (Fraction A), weighing 13.81 g, is removed and to the precipitate is added 10 volumes of ether and crystallized at −30° C. The second filtrate (Fraction B), weighing 54.03 g, is isolated and removed. The remaining precipitate (Fraction C), weighing 53.80 g, is then isolated.

The composition of the three fractions is determined to be as follows: Fraction A is 0% saturated acid, 25% oleic acid, and 75% linoleic acid; Fraction B is 5% saturated acid, 83% oleic acid, and 12% linoleic acid; and Fraction C is 89% saturated acid, 6% oleic acid, and 5% linoleic acid. Those of skill in the art will appreciate that additional crystallizations can be carried out on these fractions to further separate the fatty acids by type, if desired. Accordingly, such fractional crystallization provides an attractive separation route for separating fatty acids by type, in accordance with embodiments of the present invention.

7. Conclusion

The foregoing describes methods and systems for processing triglyceride-containing biologically-derived oils so as to allow for the generation of both transportation fuels and ester-based lubricants from a common biomass feedstock. Depending on the embodiment, the transportation fuel can be paraffinic or ester-based. Such methods/systems therefore provide a flexible and efficient way to make such fuels and lubricants, thereby addressing a need described above.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed:

1. A method for integrated production of a biolubricant and a transportation fuel product from a common biomass feedstock, said method comprising the steps of:
   a) providing a quantity of biologically-derived oil, said oil comprising triglycerides;
   b) processing the biologically-derived oil so as to hydrolyze at least some of the triglycerides contained therein so as to form free fatty acids therefrom, wherein the processing step comprises acid- or base-catalyzed hydrolysis, and wherein the fatty acids are of a type selected from the group consisting of saturated fatty acids, monounsaturated fatty acids, and polyunsaturated fatty acids, and combinations thereof;
   c) separating the fatty acids by type, such that at least the monounsaturated fatty acids are substantially isolated from the saturated fatty acids and the polyunsaturated fatty acids;
   d) modifying at least some of the monounsaturated fatty acids to form an ester product comprising triester species, wherein said ester product is suitable for use as a lubricant or component thereof, and wherein said modifying comprises the following substeps:
      i) esterifying monounsaturated fatty acids so as to form unsaturated esters;
      ii) epoxidizing the unsaturated esters to form epoxy-ester species comprising an epoxide ring;
      iii) opening the ring of the epoxy-ester species to form dihydroxy esters; and
      iv) esterifying at least some of the dihydroxy esters with an esterifying species so as to form an ester product, wherein the esterifying species is selected from the group consisting of carboxylic acids, acyl halides, acyl anhydrides, and combinations thereof;
   e) esterifying at least some of the saturated fatty acids with a quantity of at least one alcohol species so as to yield a monoester product comprising a quantity of monoesters; and
   f) utilizing the monoester product as a transportation fuel or component thereof.

2. The method of claim 1, further comprising a step of subjecting biomass to an extraction process, wherein said extraction process provides for a quantity of biologically-derived oil comprising triglycerides.

3. The method of claim 1, wherein the biologically-derived oil originated from a biomass source selected from the group consisting of crops, vegetables, microalgae, and combinations thereof.

4. The method of claim 1, wherein the separating step comprises fractional crystallization.

5. The method of claim 1, wherein the saturated fatty acids and the polyunsaturated fatty acids are substantially isolated from each other.

6. The method of claim 1, wherein the substep of esterifying the monounsaturated fatty acids involves at least one alcohol species.

7. The method of claim 6, wherein the at least one alcohol species comprises methanol.

8. The method of claim 1, wherein the substep of esterifying the monounsaturated fatty acids with at least one alcohol species involves conversion of the fatty acids to species selected from the group consisting of acyl halide species, acyl anhydride species, and combinations thereof.

9. The method of claim 1, wherein the substep of opening the ring of the epoxy-ester species to form dihydroxy esters involves an acid-catalyzed reaction.

10. The method of claim 1, further comprising a step of blending the ester product with one or more other triester species derived from a different source.

11. The method of claim 1, further comprising a step of blending the ester product with one or more diester species.

12. The method of claim 1, further comprising a step of blending the ester product with a base oil selected from the group consisting of Group I oils, Group II oils, Group III oils, and combinations thereof.

13. The method of claim 1, wherein the transportation fuel is a diesel fuel.

14. A method for integrated production of a biolubricant and a monoester product from a common biomass feedstock, said method comprising the steps of;
 a) providing a quantity of biologically-derived oil, said oil comprising triglycerides;
 b) processing the biologically-derived oil so as to hydrolyze at least some of the triglycerides contained therein so as to form free fatty acids therefrom, wherein the fatty acids are of a type selected from the group consisting of saturated fatty acids, monounsaturated fatty acids, and polyunsaturated fatty acids, and combinations thereof;
 c) separating the fatty acids by type, such that the monounsaturated fatty acids are substantially isolated from the saturated fatty acids and the polyunsaturated fatty acids;
 d) modifying at least some of the monounsaturated fatty acids to form an ester product comprising triester species, wherein the ester product is suitable for use as a lubricant, and wherein the step of modifying comprises the following substeps:
  i) esterifying monounsaturated fatty acids so as to form unsaturated esters;
  ii) epoxidizing the unsaturated esters to form epoxy-ester species comprising an epoxide ring;
  iii) opening the ring of the epoxy-ester species to form dihydroxy esters; and
  iv) esterifying at least some of the dihydroxy esters with an esterifying species so as to form an ester product, wherein the esterifying species is selected from the group consisting of carboxylic acids, acyl halides, acyl anhydrides, and combinations thereof; and
 e) esterifying at least some of the saturated fatty acids with a quantity of at least one alcohol species so as to yield a monoester product comprising a quantity of monoesters, wherein at least some of monoesters are utilized as a transportation fuel or component thereof.

* * * * *